Oct. 27, 1970     S. H. NYMAN     3,536,798

METHOD OF GLAZING A CERAMIC SURFACE

Filed Feb. 20, 1969     3 Sheets-Sheet 1

HARDEN & SET

DRY

GLAZE & BODY FIRING

INVENTOR
STEPHEN H. NYMAN

BY Scrivener Parker Scrivener & Clarke
ATTORNEYS

Oct. 27, 1970 S. H. NYMAN 3,536,798
METHOD OF GLAZING A CERAMIC SURFACE
Filed Feb. 20, 1969 3 Sheets-Sheet 2

DRY & HARDEN

GRIND

INVENTOR
STEPHEN H. NYMAN

BY
Scrivener Parker Scrivener & Clarke
ATTORNEYS

Oct. 27, 1970  S. H. NYMAN  3,536,798

METHOD OF GLAZING A CERAMIC SURFACE

Filed Feb. 20, 1969  3 Sheets-Sheet 3

*INVENTOR*
STEPHEN H. NYMAN

BY
*Scrivener Parker Scrivener & Clarke*
ATTORNEYS

United States Patent Office 3,536,798
Patented Oct. 27, 1970

3,536,798
METHOD OF GLAZING A CERAMIC SURFACE
Stephen H. Nyman, 4817 36th St. NW.,
Washington, D.C. 20007
Continuation-in-part of application Ser. No. 609,411,
Jan. 16, 1967. This application Feb. 20, 1969, Ser.
No. 813,367
Int. Cl. C04b 33/34
U.S. Cl. 264—62                                                7 Claims

ABSTRACT OF THE DISCLOSURE

Method of glazing the surface of an edged ceramic body to produce a glaze which is of constant thickness throughout the glazed surface to the edge of the ceramic surface, thus avoiding rounding and thinning of the glaze at the edge of the surface and fleeing of the glaze from the edge of the surface, the method being performed by surrounding the body, to a level flush with the surface to be glazed, with a binder material, as defined and described herein, then applying glazing material to the ceramic surface and the flush surface of the binder material, then subjecting to glazing or firing temperature, and then removing the binder material and the glaze thereon to the edge of the ceramic surface.

RELATION TO OTHER CASES

This application is a continuation of my co-pending application Ser. No. 609,411, filed Jan. 16, 1967, for Method of Glazing a Ceramic Surface.

DESCRIPTION OF THE INVENTION

Figure 1:
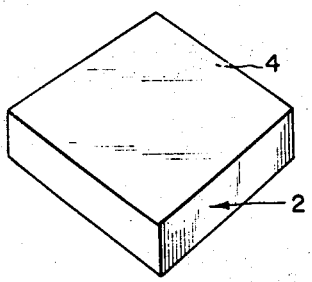
FIG. 1 is a perspective view of a flat piece of moist clay, of any dimensions or shape that may be desired.
Figure 2:
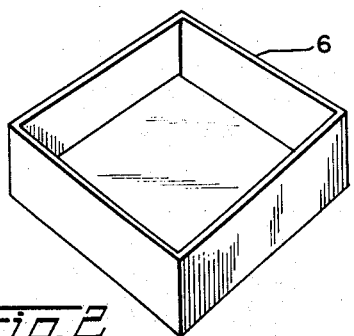
FIG. 2 is a perspective view of a binder mold frame to be used with the clay piece of FIG. 1.

The invention relates to the art of ceramics and, more particularly, to that part of the art having to do with the application of glaze to ceramic bodies of clay or bisque to form such articles as tiles.

In glazing clay or bisque the glaze will often flee from a sharp edge, leaving unglazed peripheral borders around the glazed surface, and even if the glaze does not flee from a sharp edge it will often fire thinner at the edge, leaving a border of lighter color. This fleeing of glaze from a sharp edge and thinning of glaze at an edge can be avoided by rounding the edges of tile and clay, and in order to avoid these objectionable effects sharp edges are never used in ceramics having glazed surfaces, and all commercially available glazed tiles have rounded edges. However, when a number of such pieces are assembled to form a surface, the adjacent rounded edges give the effect of a groove along the borders of adjacent pieces. Sharp edges in making ceramics other than tile are also avoided, and many objects made of pottery, such as boxes, ashtrays, plates and trivets, must be made with round or beveled edges so that the glaze will cover the whole surface.

The only mosaic faience having a flat surface of bisque and glaze, with glaze of constant thickness to each edge and consistent glaze color, is made in Iran by actually cutting large pieces of glazed tile into the many pieces required for a complicated design, and by chipping away the glaze and body at the periphery of each of the many pieces. This laborious process results in consistent color and glaze of constant thickness to each edge, so that the surface of the mosaic presents a flat appearance in its entirety, with no grooves between adjacent pieces.

It is the object of this invention to provide a method of manufacturing glazed ceramic pieces having glaze of constant thickness to each edge of the glazed surface, thus making it possible to provide pottery and glazed tile with the sharp edges, flat glazed surface and consistent color found in Iranian mosaic faience, and which will be less costly than the laborious Iranian hand method.

In accordance with the invention the periphery of a piece of clay or bisque is surrounded to the level of the surface to be glazed with a material, known and referred to herein as a "binder" the qualities and characteristics of which are fully described hereinafter and need not be repeated here. When this binder is in place and has hardened, glaze is applied to the flush surfaces of the ceramic and the surrounding binder. Upon firing the glaze the binder disintegrates or can easily be removed together with the glaze on it, leaving on the ceramic surface a layer of glaze of constant thickness and color continuing outwardly to each edge of the ceramic surface. The invention is useful in making a single piece of flat glaze pottery, or many pieces positioned adjacent each other in conformity with a design, or with many pieces not adjacent to each other and not touching, or with any edges of a piece of pottery, such as those of the surfaces composing a box, for example.

The binder, as the word is used in this specification and the claims, is a material which initially is moldable and sufficiently soft and flowable that it will easily penetrate small cracks and crevices and which will harden on drying to a material which is friable when heated to glazing temperature. Many materials and combinations of materials may be used to make the binder. Examples are: a mixture of water and plaster of paris, alone, or in combination with an additive such as clay, sand, grog, chamotte or pulverized stone, or in combination with two or more of these additives. Another example is a mixture of water and cement, alone or in combination with one or more of the additives listed above. Still another is a mixture of water and water putty, alone or in combination with one or more of the additives listed above. A mixture of water, plaster of paris and cement, alone or in combination with one or more of the additives listed above, can be used, as can a mixture of water, plaster of paris and water putty, or a mixture of water, cement and water putty. There may be many more such materials or combinations of materials, either now known or determinable by experiment, and all such materials, known and unknown, which fulfill the functional specifications set forth above are included within the word "binder" as used herein. The invention, however, is not the provision of a formula for the binder, no matter of what it may be composed.

Figure 3:
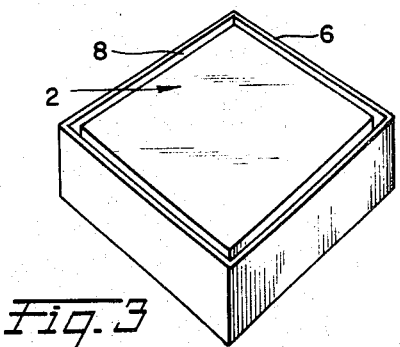
FIG. 3 shows the piece of moist clay of FIG. 1 within the frame of FIG. 2.
Figure 4:
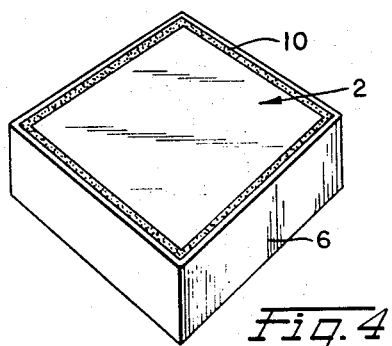
FIG. 4 shows the clay of FIG. 1 within the frame of FIG. 2 after pouring of the binder.
Figure 5:
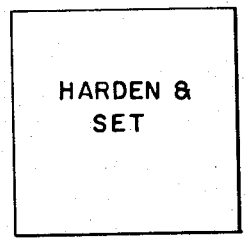
FIG. 5 shows schematically the assembly of FIG. 4 being allowed to harden and set.
Figure 6:
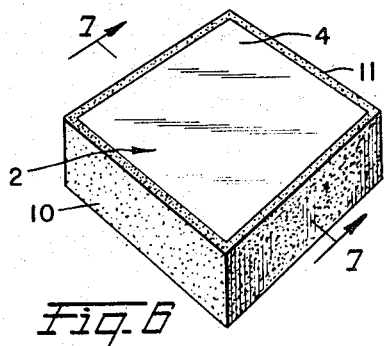
FIG. 6 shows the clay and binder after removal of the frame of FIG. 2.
Figure 7:
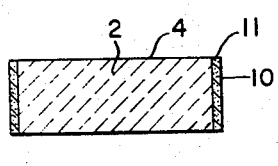
FIG. 7 is a sectional view taken on line 7—7 of FIG. 6.
Figure 8:
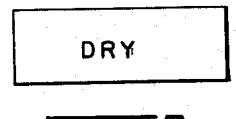
FIG. 8 represents schematically the drying of the assembly of FIG. 7.
Figure 9:
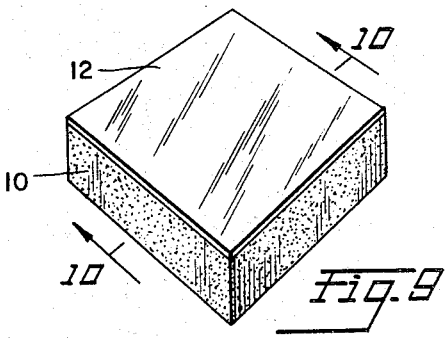
FIG. 9 is a perspective view of the assembly after the application of glaze.
Figure 10:
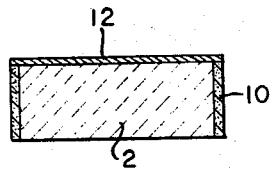
FIG. 10 is a sectional view taken on line 10—10 of FIG. 9.
Figure 11:
FIG. 11 shows schematically the firing of the glazed assembly.

In carrying out the method according to this invention a piece of clay 2, which is shown in perspective in FIG. 1, is cut, pressed, molded or otherwise formed into any size and shape desired with at least one flat surface 4. This piece is placed in a mold 6 having preferably the same inside height as the piece of clay and which roughly conforms in shape to the lateral periphery of the piece of clay but is larger in lateral dimensions, so that a space 8 surrounds the clay piece within the mold, as shown in FIG. 3. This space is now filled with a binder material 10 as shown in FIG. 4, which will harden and set but which will disintegrate and be readily removable after being subjected to glazing temperature. The binder is smoothed so that its surface 11 is flush with the flat surface 4 of the clay piece 2. The clay and binder are then allowed to harden and set, as shown schematically in FIG. 5, after which the frame 6 is removed, leaving the piece of clay 2 surrounded by and enclosed in a border of the binder 10, as shown in FIGS. 6 and 7. If desired the clay and binder assembly may then be allowed to dry, as shown schematically in FIG. 8, although this is not a necessary prerequisite to glazing. When the clay and binder assembly has set and hardened a layer of glaze 12 is applied to the flush surfaces 4, 11 of the body 2 and binder 10, as shown in FIGS. 9 and 10. If the glaze has been applied in a fluid base the assembly is allowed to dry and is then fired for both the glaze and body, as shown schematically in FIG. 11.

Figure 12:
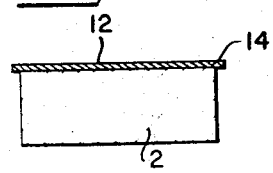
FIG. 12 is a sectional view of the assembly after firing and removal of the disintegrated binder.
Figure 13:
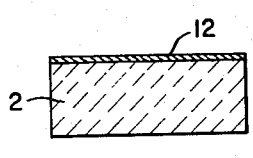
FIG. 13 is a sectional view of the finished piece of glazed tile.

After the glaze firing the binder 10 is easily removed, sometimes falling away without the use of brushing or air or water pressure. This leaves the piece of tile 2 with an overhanging edge 14 of glaze, as illustrated in FIG. 12, which may be removed by brushing, filing, sanding, cutting or other means. What then remains is a covering of glaze over the entire flat surface of the tile 2, the glaze being flat and of constant thickness from edge to edge of the tile, and there being no thinness at the edge which will cause variation in color, and no fleeing from the edges. This is shown in FIG. 13.

Figure 14:
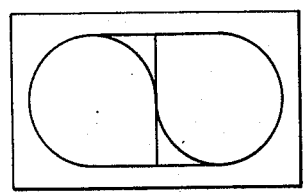
FIG. 14 is a design to be made into mosaic in accordance with the invention.

In another variation of the invention, a mosaic is formed of glazed tile pieces each having the different shapes of the separate pieces of a floral, geometric or other design and all fitting together. This variation can also be used to make multiple pieces of glazed tile of the same regular geometric shape such as that of FIG. 1 repeated any number of times. The first step in this form of the invention is to plan the design and draw it on a sheet of paper or other material, and for the purposes of this specification a simple design, which is shown in FIG. 14, has been disclosed, although it will be understood that any design may be used in making this type of tile. In order to make multiple pieces of glazed tile of the same regular geometric shape it is, of course, not necessary to draw a design on paper.

Figure 15:
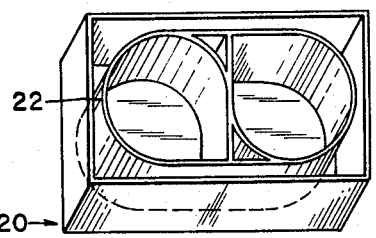
FIG. 15 is a cutter having the design of FIG. 14, with which the piece of clay of FIG. 16 is to be incised.

When the design has been drawn an incising device 20 (similar to a "cookie cutter" or a jigsaw puzzle cutter) is made having vertical cutting blades in exactly the same outline and arrangement as the parts of the design which has been drawn and which is illustrated in FIG. 14. The cutting device for this design is shown in perspective in FIG. 15 and it will be seen that each cutting element, or blade 22 is formed of a strip of metal, plastic or other similar material. The design of the vertical blades is the same as that of FIG. 14 because, in this form of the invention, the un-incised under side of the sheet of clay is used for the face of the mosiac, and not the upper side through which the blades of the cutter pass in incising the clay.

Figure 16:
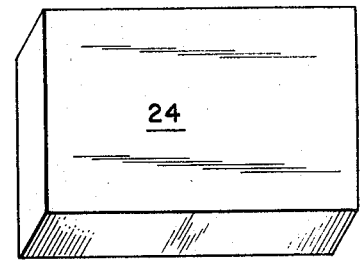
FIG. 16 is a piece of clay to be made into a mosaic of pieces having the design of FIG. 14.

A sheet of moist clay 24 is prepared, being somewhat greater in length and width than the design and of any thickness that may be desired, and is shown in perspective in FIG. 16. This sheet of clay is placed on a flat surface and is incised by the cutter, whose blades are pressed into the clay, incising it at 25 along the lines of the design of FIG. 14, but reversed, as shown in FIGS. 17 and 18.

Figure 17:
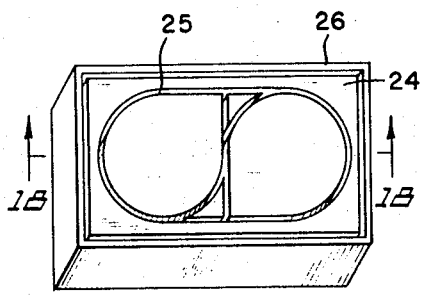
FIG. 17 is a perspective view of the top of the piece of clay after it has been incised by the cutter of FIG. 15.
Figure 18:
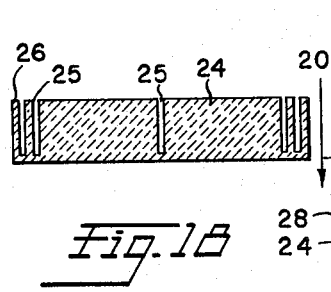
FIG. 18 is a sectional view taken on line 18—18 of FIG. 17.
Figure 19:
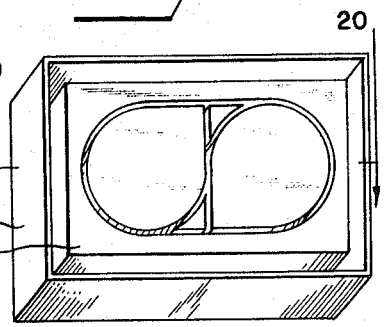
FIG. 19 is a perspective view of the incised piece of clay within a molding frame after removal of excess clay.
Figure 20:
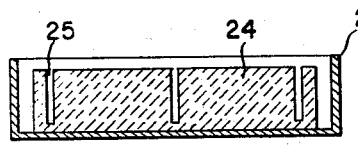
FIG. 20 is a sectional view taken on line 20—20 of FIG. 19.
Figure 21:
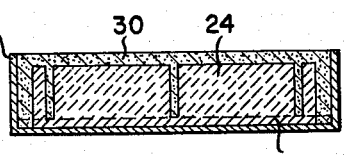
FIG. 21 shows the assembly of FIGS. 19 and 20 after pouring of the binder, showing in the area below the dotted line the part of the piece of clay to be ground away.
Figure 22:
FIG. 22 is a schematic representation of the drying and hardening of the assembly of FIG. 21.
Figure 23:
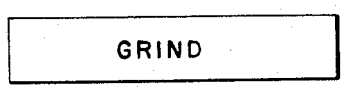
FIG. 23 is a schematic representation of the grinding away of part of the assembly of FIG. 21.
Figure 24:
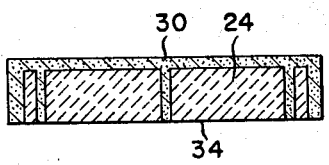
FIG. 24 shows sectionally the assembly of clay and binder after the frame has been removed and the lower part of the clay and binder have been ground away.
Figure 25:
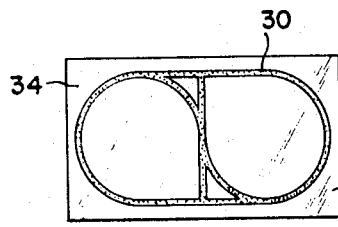
FIG. 25 is an elevational view of the underside of the assembly after the grinding away of the lower part of the clay and binder.
Figure 26:
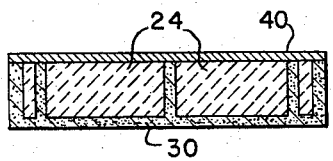
FIG. 26 shows schematically the glazing of the flush clay and binder faces of the assembly.
Figure 27:
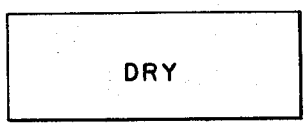
FIG. 27 shows schematically the drying of the assembly of clay, binder and glaze.
Figure 28:
FIG. 28 shows schematically the firing of the dried assembly of clay, binder and glaze.
Figure 29:
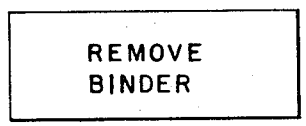
FIG. 29 shows schematically the removal of the disintegrated binder after firing.

The excess clay surrounding the design, as shown at 26 in FIGS. 17 and 18, is removed and the incised sheet of clay 24 is placed in an open mold box 28 is a little larger in lateral and vertical dimensions than the incised sheet of clay, as shown in FIGS. 19 and 20. Binder 30 is then poured onto the incised surface of the clay in such a manner that the incisions will be filled as well as the space between the outside of the sheet of clay and the mold, as shown in FIG. 21, after which the clay and binder assembly are allowed to dry and harden, as shown schematically in FIG. 22. The mold is then removed and the base 32 of the sheet of clay is ground away, as shown schematically in FIG. 23, sufficiently to uncover that part of the binder which has filled the incisions in the sheet of clay, leaving a plaque composed of the binder 30 and the pieces of clay 24 in the shapes of the elements of the design, the surface of the binder being flush with the surfaces of the pieces of clay, as shown at 34 in FIG. 24. The former underside of the sheet of clay now presents the smooth surface 34 upon which the outlines of the parts of the design are formed by lines of binder filling the spaces between the pieces of clay, as shown in FIG. 25. A layer 40 of glaze is now applied to the surface 34, as shown in FIG. 26. If a fluid base glaze is used the assembly is now allowed to dry, as shown schematically in FIG. 27, and is then fired, as shown schematically in FIG. 28, hardening the clay into tile, fusing the glaze and making the binder removable, which can now be done by any suitable means such as brushing or using a stream of air or water, this being represented schematically in FIG. 29.

Figure 30:
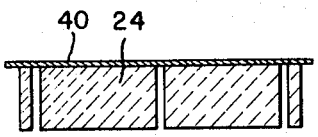
FIG. 30 shows the resulting pieces of tile held together by a surmounting sheet of glaze.
Figure 31:
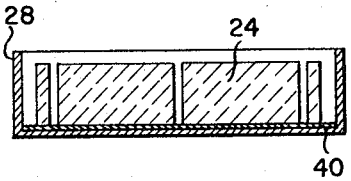
FIG. 31 shows sectionally the tile and glaze placque inverted and placed in a mold for application of plaster of paris.
Figure 32:
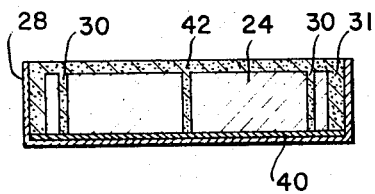
FIG. 32 shows sectionally the same assembly and parts after application of plaster of paris.
Figure 33:
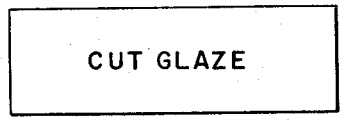
FIG. 33 shows schematically the removal of the glaze located over the space between the pieces of tile.
Figure 34:
FIG. 34 shows schematically the firing to disintegrate the plaster of paris.
Figure 35:
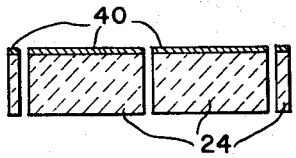
FIG. 35 shows a cross section of the finished glazed pieces of clay.

What remains is an assembly consisting of a sheet of glaze 40 superimposed on, and holding together, the pieces of tile 24, each of which has the shape of one of the elements of the design of FIG. 14, as shown in section in FIG. 30. This assembly is now placed with glaze 40 down in the same mold 28 that was used in applying the binder, as shown sectionally in FIG. 31, and is moistened and a layer of plaster of pairs 42 is poured into the mold, filling the spaces 30 between the pieces of tile and the space 31 between the outer edges of the tile and the mold as shown sectionally in FIG. 32. When the plaster of paris has hardened, the plaque is placed glazed side up and those parts of the glaze that have no tile backing, but are now backed by plaster of paris, namely the glaze covering the spaces 30 and 31 between the tile pieces and around the outer edges of the plaque, are cut, as shown schematically in FIG. 33, which may be done by any suitable means, such as needles or cutting points moving rapidly up and down, or with a hand operated or machine driven blade, the plaster of paris keeping the cutting blade from forcing the pieces apart and breaking some of them. The plaster of paris is then disintegrated by another firing at a low temperature of about 500° F., as shown schematically in FIG. 34, after which it is easily removed from the tile and the plaques now becomes individual pieces of glazed tile, as shown sectionally in FIG. 35, the glaze being flat from edge to edge, there being no thickness at the edges which will cause variation in color, and there being no fleeing of glaze from the edges.

In another form which the invention may take the glaze is applied to the surface of the clay piece through which the cutter blade passes in incising the clay, instead of the unincised underside of the clay as in the form of the invention which has just been described. In this method the plaque shown in FIG. 24 is prepared in the same manner as described above, after which the layer of binder 30 above the clay pieces 24 is ground away sufficiently to remove any roundness at the tops of the sections 24 caused by the incising action of the cutter, and sufficiently to remove the binder down to the surfaces of the clay pieces 24. The exposed surfaces of the clay pieces now present a smooth surface upon which the outlines of the parts of the design are formed by lines of binder filling the spaces between the clay pieces, the design being the reverse of that shown in FIG. 25. A layer of glaze is now applied to this surface and the remainder of the process is carried out exactly as described above for glazing the other side of the pieces of clay. This variation is necessary when it is desired to repeat an asymmetrical design or pattern in reverse.

In carrying out the invention in any of its many forms there may be two firings, one for the clay (or bisque) and one for the glaze. In this variation the clay is fired after being formed into the desired shape, the binder is then applied in a mold, the binder and clay are allowed to dry if desired, and then the glaze is applied to the clay and binder and the assembly is dried and then fired again in a glost firing. The other steps of each form of the invention, including removal of the binder and the overhanging edge of glaze, are the same.

I claim:
1. The method of glazing a surface of a ceramic body comprising the steps of:
 (a) placing a ceramic body having at least one flat surface in a mold in such a manner that a gap is formed around the periphery of the body between the body and the mold and at least one flat surface of the body is in substantially the same plane with the top surfaces of the mold,
 (b) filling the gap with a binder until the top surface of the binder is in the same plane with the top surfaces of the mold and the substantially co-planar surface of the body, the binder being of a different material than the body and sufficiently flowable that it will easily penetrate small cracks and crevices and will harden on drying to a material which will be readily removable from the body after it is subjected to glazing temperatures,
 (c) setting or hardening the binder,
 (d) removing the composite body and hardened binder from the mold,
 (e) applying a layer of glaze to the surfaces of the composite body and binder which are in substantially the same plane,
 (f) heating the glazed composite to dry and fuse the glaze,
 (g) cooling the glazed composite and removing the now friable binder from the body, and
 (h) removing the overhanging edges of glaze material to form a body having at least one flat surface completely covered with a glaze of constant thickness.

2. The method according to claim 1, in which the ceramic body is fired before glazing and the body and layer of glaze material are subsequently given a glaze firing.

3. The method of forming a mosaic of glazed tile which comprises the steps of:
 (a) preparing a multi-part design;
 (b) partially cutting through a piece of ceramic to form parts having the same shape as those of the design and connected by a layer of un-cut ceramic;
 (c) covering the cut piece of ceramic and filling the cuts therein with a binder, the binder being of a different material than the body and sufficiently flowable that it will easily penetrate small cracks and crevices and will harden on drying to a material which will be readily removable from the body after it is subjected to glazing temperatures;
 (d) removing the layer of un-cut ceramic to expose the cuts and the binder therein;
 (e) replacing the removed layer of ceramic with a layer of glaze which covers the ceramic parts and the binder;
 (f) firing;
 (g) removing the binder, leaving the ceramic parts connected only by the glaze;
 (h) cutting the glaze along the peripheries of the ceramic parts; and
 (i) assembling the glazed ceramic parts into a mosaic.

4. The method according to claim 3, comprising after removal of the binder, the additional steps of surrounding the ceramic and filling the cuts with plaster of paris, allowing the plaster of paris to harden, and removing the plaster of paris after cutting the glaze.

5. The method according to claim 3, comprising the additional step of a bisque firing before addition of the binder, and the second firing is a glost firing.

6. The method of forming a mosaic of glazed tile which comprises the steps of:
 (a) preparing a multi-part design;
 (b) partially cutting through a piece of ceramic to form parts having the same shape as those of the design and connected by a layer of un-cut ceramic;
(c) covering the cut piece of ceramic and filling the cuts therein with a binder, the binder being of a different material than the body and sufficiently flowable that it will easily penetrate small cracks and crevices and will harden on drying to a material which will be readily removable from the body after it is subjected to glazing temperatures;
(d) removing the layer of un-cut ceramic to expose the cuts and the binder therein;
(e) removing the binder from the opposite side to expose the pieces of ceramic and the cuts between them;
(f) replacing the removed layer of binder with a layer of glazed which covers the ceramic parts and the binder;
(g) firing;
(h) removing the binder, leaving the ceramic parts connected only by the glaze;
(i) cutting the glaze along the peripheries of the ceramic parts; and
(j) assembling the glazed ceramic parts into a mosaic.

7. The method of glazing a surface of a plurality of ceramic bodies comprising the step of:
(a) placing a plurality of ceramic bodies each having at least one flat surface in a mold in such a manner that gaps are formed between the individual bodies and between each body and the mold, and at least one flat surface of each body is in substantially the same plane with the top surfaces of the mold,
(b) filling the gaps with a binder until the top surface of the binder is in the same plane with the top surfaces of the mold and at least one flat surface of each body, the binder being a different material than the bodies and sufficiently flowable that it will easily penetrate small cracks and crevices and will harden on drying to a material which will be readily removable from the bodies after it is subjected to glazing temperatures,
(c) setting or hardening the binder,
(d) removing the composite bodies and hardened binder from the mold,
(e) applying a layer of glaze to the surface of the composite bodies and binder which are in substantially the same plane,
(f) heating the glazed composite to dry and fuse the glaze,
(g) cooling the glazed composite and removing the now friable binder from the bodies, and
(h) removing the overhanging edges of glaze material to form bodies having at least one flat surface completely covered with glaze of constant thickness.

References Cited
UNITED STATES PATENTS

| | | | |
|---|---|---|---|
| 2,246,052 | 6/1941 | Madala | 264—60 |
| 2,274,907 | 3/1942 | Madala | 264—60 |
| 2,907,129 | 10/1959 | Bedell | 264—67 |

JULIUS FROME, Primary Examiner

J. H. MILLER, Assistant Examiner

U.S. Cl. X.R.
117—69; 264—67